US008380255B2

(12) United States Patent
Shearer et al.

(10) Patent No.: US 8,380,255 B2
(45) Date of Patent: Feb. 19, 2013

(54) POWER TRANSMISSION NETWORK

(75) Inventors: John G. Shearer, Ligonier, PA (US);
Charles E. Greene, Pittsburgh, PA (US);
Daniel W. Harrist, Carnegie, PA (US)

(73) Assignee: Powercast Corporation, Ligonier, PA (US)

( * ) Notice: Subject to any disclaimer, the term of this patent is extended or adjusted under 35 U.S.C. 154(b) by 0 days.

(21) Appl. No.: 12/953,059

(22) Filed: Nov. 23, 2010

(65) Prior Publication Data

US 2011/0062791 A1 Mar. 17, 2011

Related U.S. Application Data

(63) Continuation of application No. 11/438,508, filed on May 22, 2006, now Pat. No. 7,844,306.

(60) Provisional application No. 60/683,991, filed on May 24, 2005.

(51) Int. Cl.
*H04B 1/38* (2006.01)

(52) U.S. Cl. ........ 455/571; 455/572; 455/573; 455/574; 455/127.1; 455/299; 455/343.1; 455/420; 455/550.1; 455/562.1; 320/101; 320/106; 320/108; 320/109; 320/110; 320/114; 320/115; 250/336.1; 250/341.3

(58) Field of Classification Search ............... 455/127.1, 455/299, 402, 550.1, 562.1, 420, 572, 573, 455/343.1; 250/336.1, 338.1, 341.3, 361; 320/101, 106, 108, 109, 110, 114, 115
See application file for complete search history.

(56) References Cited

U.S. PATENT DOCUMENTS

| | | | |
|---|---|---|---|
| 5,630,213 A * | 5/1997 | Vannatta | 455/133 |
| 5,963,012 A | 10/1999 | Garcia et al. | |
| 6,633,026 B2 | 10/2003 | Tuominen | |
| 6,658,252 B2 | 12/2003 | Mohebbi | |
| 6,792,259 B1 | 9/2004 | Parise | |
| 6,792,297 B2 | 9/2004 | Cannon et al. | |
| 6,798,716 B1 | 9/2004 | Charych | |
| 6,906,495 B2 * | 6/2005 | Cheng et al. | 320/108 |
| 6,967,462 B1 | 11/2005 | Landis | |
| 6,980,832 B1 | 12/2005 | Ylitalo et al. | |
| 7,068,991 B2 * | 6/2006 | Parise | 455/343.1 |
| 7,299,072 B2 * | 11/2007 | Ninomiya | 455/562.1 |
| 7,366,140 B2 * | 4/2008 | van Rensburg et al. | 370/334 |
| 7,383,064 B2 | 6/2008 | Mickle et al. | |
| 7,443,057 B2 | 10/2008 | Nunally | |
| 7,471,062 B2 | 12/2008 | Bruning | |
| 7,567,824 B2 * | 7/2009 | Mickle et al. | 455/573 |
| 7,577,452 B2 * | 8/2009 | Kimura et al. | 455/502 |
| 7,844,306 B2 | 11/2010 | Shearer et al. | |
| 2001/0000960 A1 | 5/2001 | Dettloff | |
| 2002/0022480 A1 | 2/2002 | Jensen | |
| 2003/0030342 A1 * | 2/2003 | Chen et al. | 310/102 R |
| 2004/0085224 A1 | 5/2004 | Weiss et al. | |
| 2004/0142733 A1 | 7/2004 | Parise | |

(Continued)

OTHER PUBLICATIONS

Office Action for U.S. Appl. No. 11/438,508, mailed on May 22, 2009.

(Continued)

*Primary Examiner* — Olumide T Ajibade Akonai

(57) ABSTRACT

A network for power transmission to a receiver that converts the power into current includes a first node for transmitting power wirelessly in a first area. The first area has a minimum electric or magnetic field strength. The network includes a second node for transmitting power wirelessly in a second area. The second area has a minimum electric or magnetic field strength and overlaps the first area to define an overlap area. In another embodiment, the network includes a source in communication with the first and second nodes which provides power to them. Also disclosed are methods for power transmission to a receiver that converts the power into current.

18 Claims, 16 Drawing Sheets

U.S. PATENT DOCUMENTS

2006/0199620 A1    9/2006    Greene et al.

OTHER PUBLICATIONS

Office Action for U.S. Appl. No. 11/438,508, mailed Feb. 19, 2010.
International Search Report and Written Opinion for International Application No. PCT/US06/19772, mailed on Oct. 18, 2007.
Office Action for Chinese Patent Application No. 200680017718.5, dated Aug. 11, 2010.
Written Opinion for Singapore Patent Application No. 200717940-1, dated Oct. 24, 2008.
Examination Report for Singapore Patent Application No. 200717940-1, dated Jun. 26, 2009.
Office Action for Mexican Patent Application No. MX/a/2007/013940, dated Jan. 26, 2010.
Examination Report for Australian Patent Application No. 2006251566, dated Nov. 4, 2009.

* cited by examiner

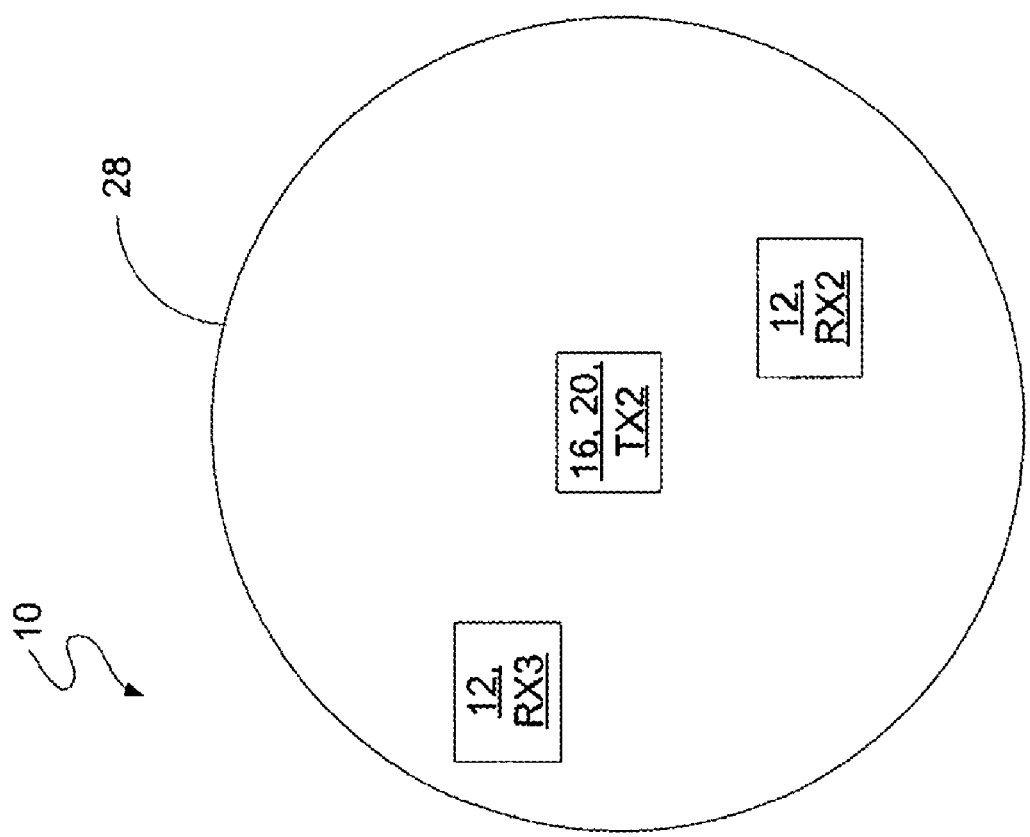
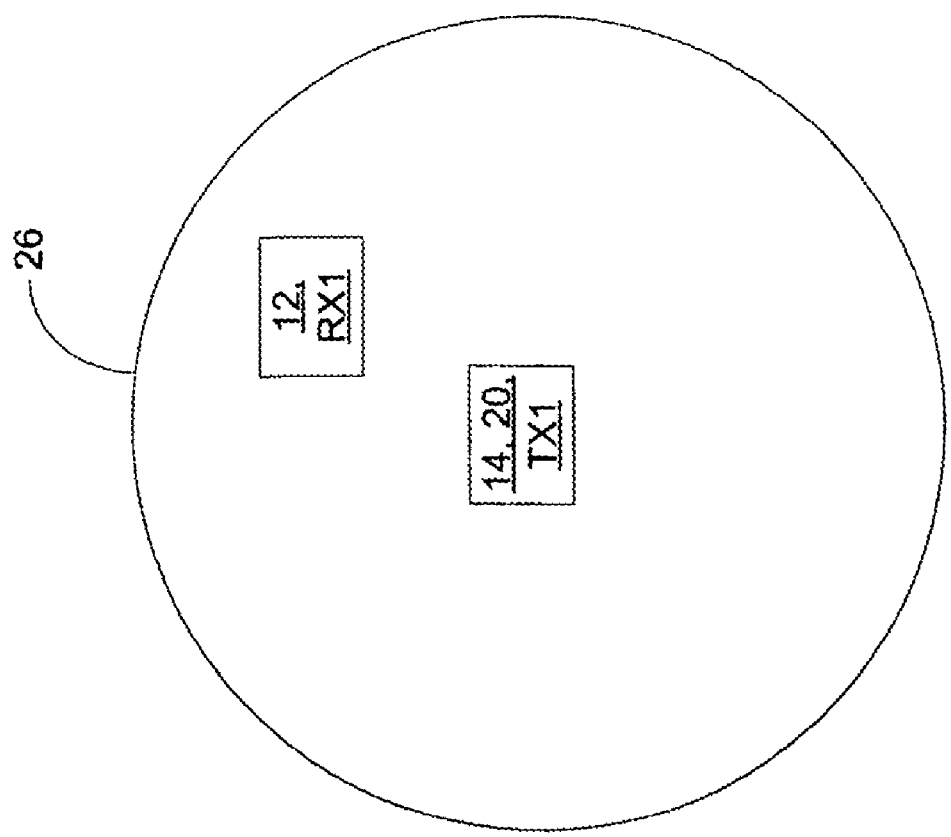
Fig. 1

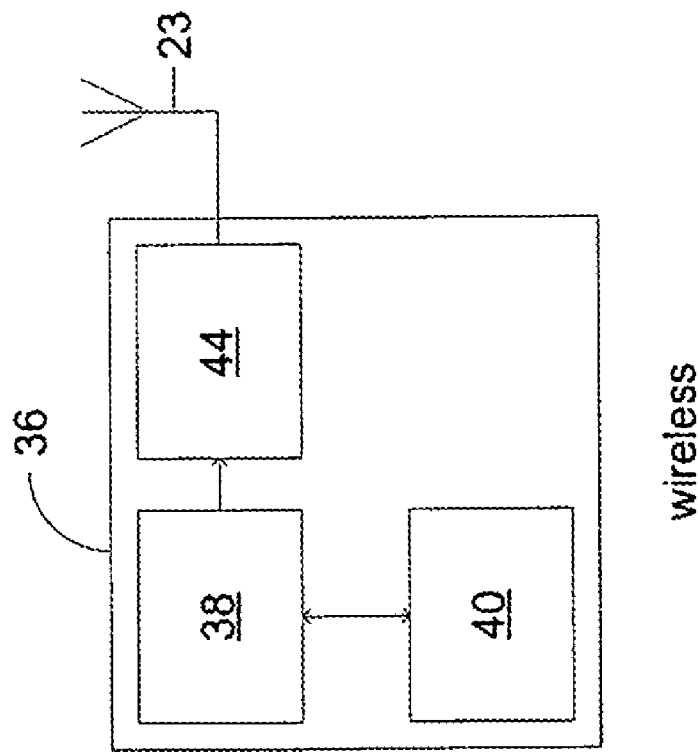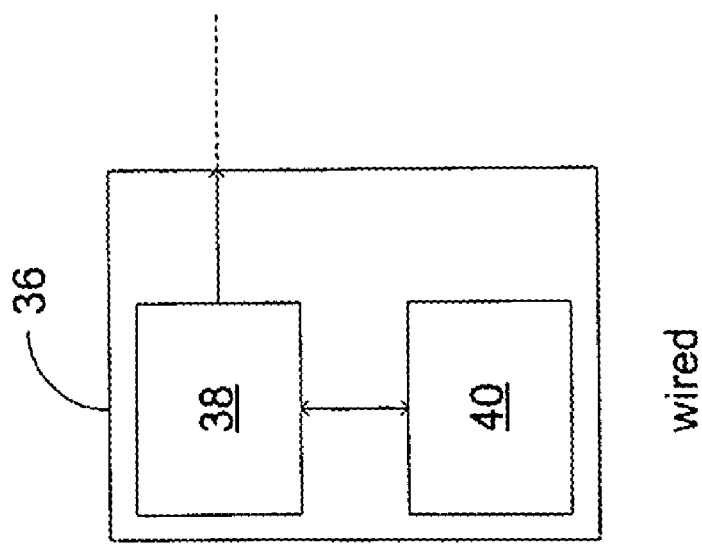
Fig. 6

POWER TRANSMISSION NETWORK

CROSS-REFERENCE TO RELATED APPLICATIONS

This application claims priority to and is a continuation of U.S. patent application Ser. No. 11/438,508, filed May 22, 2006 (now U.S. Pat. No. 7,844,306), which claims priority to and the benefit of U.S. Provisional Patent Application Ser. No. 60/683,991, filed May 24, 2005; each of which is incorporated herein by reference in its entirety.

FIELD OF THE INVENTION

The present invention is related to wireless power transmission networks. More specifically, the present invention is related to wireless power transmission networks having overlapping areas and/or having a plurality of nodes.

BACKGROUND OF THE INVENTION

Power transmission networks are around us every day. The most common is the alternating current (AC) power network within our homes and office buildings. The utility companies use this wired network to supply AC power to us. This network is capable of supplying large amounts of power to a device directly connected to it.

The key to the operation of this network is the direct connection. It is not always possible or practical to hardwire or plug-in every device. An example of this can be seen by examining the building automation market.

There is currently a drive to conserve energy in office buildings and homes. This is done by optimizing how the power is used. As an example, there is no need to light a room when it is not occupied. This problem has been addressed and is solved by placing a motion sensor in the room. When there is no motion for a given period of time, the lights are turned off.

The problem with this solution is that each motion sensor requires power. This means that each sensor is hardwired to the AC power network or must contain a battery. This may not be practical in all applications. Each sensor must also have a way to control the operation of the lights in the room.

The current trend is to implement wireless sensors. However, the term "wireless" in this case refers only to the communication portion of the device. The power for the device must still be derived from the traditional sources such as the AC power network or batteries.

BRIEF SUMMARY OF THE INVENTION

The present invention eliminates the need for a hardwired connection for each sensor or device. The power for the device is derived from a wireless power network. This power can be used to directly power the device or to recharge or augment an internal battery. With the present invention, the device becomes wireless in both a communication and powering sense.

The present invention pertains to a network for power transmission to a receiver which converts the power into current. The network comprises a first node for transmitting power wirelessly in a first area. The first area has a minimum electric or magnetic field strength. The network comprises a second node for transmitting power wirelessly in a second area. The second area has a minimum electric or magnetic field strength and overlaps the first area to define an overlap area.

The present invention pertains to a network for power transmission to a receiver which converts the power into current. The network comprises a first node for transmitting power wirelessly in a first area. The first area has a minimum electric or magnetic field strength. The network comprises a second node for transmitting power wirelessly in a second area. The second area has a minimum electric or magnetic field strength. The network comprises a source, preferably an RF power transmission source, in communication with the first and second nodes. The power source provides power to the first and second nodes.

The present invention pertains to a method for power transmission to a receiver which converts the power into current. The method comprises the step of transmitting power wirelessly from a first node in a first area, the first area having a minimum electric or magnetic field strength. There is the step of transmitting power wirelessly from a second node in a second area. The second area has a minimum electric or magnetic field strength and overlaps the first area to define an overlap area.

The present invention pertains to a method for power transmission to a receiver which converts the power into current. The method comprises the step of transmitting power wirelessly from a first node in a first area. The first area has a minimum electric or magnetic field strength. There is the step of transmitting power wirelessly from a second node in a second area. The second area has a minimum electric or magnetic field strength. There is the step of providing power to the first and second nodes from a source, preferably an RF power transmission source, in communication with the first and second nodes.

The present invention pertains to a controller for controlling power transmission of at least one source (preferably an RF power transmission source), at least one transmitter, or at least one node to a receiver that converts the power into current. The controller preferably comprises a processor which issues instructions to the source, transmitter, or node. The controller preferably comprises a memory which stores information concerning the power transmission of the RF power transmission source, transmitter, or node.

The present invention pertains to a network for power transmission to a receiver which converts the power into current. The network comprises first means for transmitting power wirelessly in a first area. The first area has a minimum electric or magnetic field strength. The network comprises second means for transmitting power wirelessly in a second area. The second area has a minimum electric or magnetic field strength and overlaps the first area to define an overlap area.

The present invention pertains to a system for RF power transmission. The system comprises a first node for transmitting power wirelessly in a first coverage area. The first coverage area having a minimum electric or magnetic field strength. The system comprises a second node for transmitting power wirelessly in a second coverage area. The second coverage area having a minimum electric or magnetic field strength. The system comprises at least one RF power transmitter in communication with the first node and the second node. The system comprises at least one receiver, wherein the receiver receives RF power from the first node when the at least one receiver is within the first coverage area and from the second node when the at least one receiver is within the second coverage area. The at least one receiver converts the power into current.

The present invention pertains to a system for power transmission. The system comprises a receiver including a receiver antenna. The system comprises an RF power transmitter including a transmitter antenna, wherein the RF power transmitter transmits RF power in multiple polarizations, and the receiver converts the RF power to direct current.

The present invention pertains to a controller for controlling power transmission of at least one source and/or at least one antenna to a receiver which converts the power into current. The controller comprises means for issuing instructions to the at least one source and/or the at least one antenna. The controller comprises means for storing information concerning the power transmission.

BRIEF DESCRIPTION OF THE SEVERAL VIEWS OF THE DRAWING

In the accompanying drawings, the preferred embodiment of the invention and preferred methods of practicing the invention are illustrated in which:

FIG. 1 shows a power network with multiple coverage areas, where the coverage areas do not overlap.

FIG. 6 shows two block diagrams of possible controllers.

DETAILED DESCRIPTION OF THE INVENTION

Figure 2:
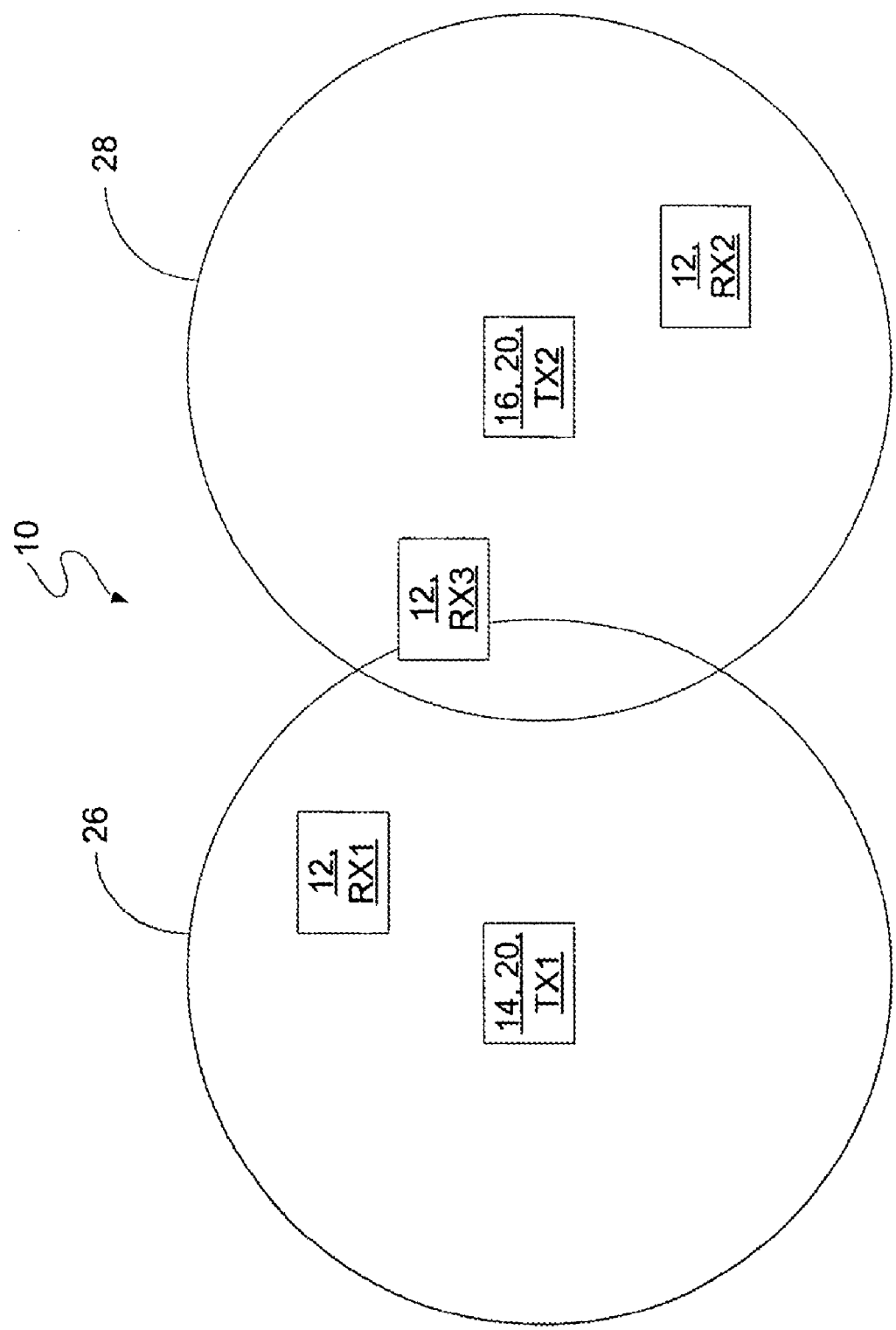
FIG. 2 shows a power network with multiple coverage areas, where at least two of the coverage areas overlap.

A complete understanding of the invention will be obtained from the following description when taken in connection with the accompanying drawing figures wherein like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to the drawings wherein like reference numerals refer to similar or identical parts throughout the several views, there is shown a network 10 for power transmission to a receiver 12 which converts the power into current. The network 10 comprises a first node 14 for transmitting power wirelessly in a first area 26. The first area 26 has a minimum electric or magnetic field strength. The network 10 comprises a second node 16 for transmitting power wirelessly in a second area 28. The second area 28 has a minimum electric or magnetic field strength and overlaps the first area 26 to define an overlap area.

Preferably, the first and second nodes 14, 16 transmit power wirelessly with different frequencies or different polarizations or in pulses that do not interfere with each other.

A node is a point of energy emanation, preferably of RF waves. A node may include an antenna 23 in communication with a transmitter outside of the coverage area (possibly in another coverage area); an antenna 23 in communication with a transmitter 20 inside the coverage area; or a unit containing an antenna and a transmitter. A node may also include a controller 36.

The network 10 preferably includes at least one controller 36 which controls the frequency or the polarization or the pulses of the first node 14 and/or the second node 16. When there is more than one controller 36, preferably, at least one controller 36 communicates with at least one other controller 36.

The network 10 preferably includes a third node 18 having a third area 30 having a minimum electric or magnetic field strength which overlaps the first area 26. The network 10 preferably includes a fourth node 24 having a fourth area 32 having a minimum electric or magnetic field strength which overlaps the second area 28, and wherein the first, second, third and fourth nodes 14, 16, 18, 24 preferably transmit power wirelessly with different frequencies or different polarizations or in pulses that do not interfere with each other, for example, according to Table 2.

Each node preferably includes a transmitter 20 and an antenna 22. Preferably, each controller 36 is in communication with the antenna 22 and/or the transmitter 20 of its associated node. Each controller 36 preferably has a memory 40 and a CPU or MCU 38 in communication with the memory 40.

The present invention pertains to a network 10 for power transmission to a receiver 12 which converts the power into current. The network 10 comprises a first node 14 for transmitting power wirelessly in the first area 26. The first area 26 has a minimum electric or magnetic field strength. The network 10 comprises a second node 16 for transmitting power wirelessly in a second area 28. The second area 28 has a minimum electric or magnetic field strength. The network 10 comprises a source 34, preferably an RF power transmission source, in communication with the first and second nodes 14, 16 which provides power to them.

Preferably, the first area 26 and the second area 28 overlap. The network 10 preferably includes a controller 36 in communication with the source 34 which controls power transmission by the first node 14 and the second node 16 such that phase cancellation of the power transmitted by the first node 14 and second node 16 is controlled. Preferably, the network 10 includes at least one additional node having an associated area in communication with the source 34.

Preferably, the network 10 includes at least one additional sources 34 each having respective nodes and controllers 36 wherein the controllers 36 are in communication with each other. The controller 36 is preferably in communication with the source 34 which controls the transmission of power wirelessly from the nodes. Preferably, the nodes transmit power wirelessly with different frequencies or different polarizations or in pulses that do not interfere with each other, for example, according to Table 2.

The present invention pertains to a method for power transmission to a receiver 12 which converts the power into current. The method comprises the step of transmitting power wirelessly from a first node 14 in a first area 26, the first area 26 having a minimum electric or magnetic field strength. There is the step of transmitting power wirelessly from a second node 16 in a second area 28. The second area 28 has a minimum electric or magnetic field strength and overlaps the first area 26 to define an overlap area.

Preferably, the step of transmitting power wirelessly from the second node 16 includes the step of transmitting power wirelessly from the second node 16 with different frequencies or different polarizations or in pulses that do not interfere with the transmission of power from the first node 14. The first node 14 may also pulse the power transmission.

The present invention pertains to a method for power transmission to a receiver 12 which converts the power into current. The method comprises the step of transmitting power wirelessly from a first node 14 in a first area 26. The first area 26 has a minimum electric or magnetic field strength. There is the step of transmitting power wirelessly from a second node 16 in a second area 28. The second area 28 has a minimum electric or magnetic field strength. There is the step of providing power to the first and second nodes 14, 16 from an RF power transmission a source 34, preferably an RF power transmission source, in communication with them.

Preferably, the step of transmitting power wirelessly from the second node 16 includes the step of transmitting power wirelessly from the second node 16 with different frequencies or different polarizations or in pulses that do not interfere with the transmission of power from the first node 14. The first node 14 may also pulse the power transmission.

There is preferably the step of controlling with a controller 36 in communication with the source 34 the frequency or polarization or pulse of power transmitted by the first node 14 and the second node 16.

The present invention pertains to a controller 36 for controlling power transmission of at least one source 34 (preferably an RF power transmission source), at least one node, or at least one transmitter 20 to a receiver 12 which converts the power into current. The controller 36 preferably comprises a processor 38 that issues instructions to the source 34, the node, or the transmitter 20. The controller 36 comprises a memory 40 that stores information concerning the power transmission of the source 34, the node, or the transmitter 20. Preferably, the controller 36 includes an antenna 23 in communication with the processor 38, for example, via a transceiver 44, through which the instructions are sent to the source 34.

The present invention pertains to a network for power transmission to a receiver which converts the power into current. The network comprises first means for transmitting power wirelessly in a first area. The first area has a minimum electric or magnetic field strength. The network comprises second means for transmitting power wirelessly in a second area. The second area has a minimum electric or magnetic field strength and overlaps the first area to define an overlap area. Preferably, the first means includes a first node, and the second means includes a second node.

The present invention pertains to a system for RF power transmission. The system comprises a first node 14 for transmitting power wirelessly in a first coverage area 26. The first coverage area 26 having a minimum electric or magnetic field strength. The system comprises a second node 16 for transmitting power wirelessly in a second coverage area 28. The second coverage area 28 having a minimum electric or magnetic field strength. The system comprises at least one source, preferably an RF power transmission source, in communication with the first node 14 and the second node 16. The system comprises at least one receiver 12, wherein the receiver 12 receives RF power from the first node 14 when the at least one receiver 12 is within the first coverage area 26 and from the second node 16 when the at least one receiver 12 is within the second coverage area 28. The at least one receiver 12 converts the power into current.

Preferably, the first coverage area 26 and the second coverage area 28 overlap to define an overlap area.

The receiver 12 preferably receives RF power from the first node 14 and the second node 16 in the overlap area. Preferably, the first node 14 and the second node 16 transmit power in multiple frequencies, polarizations and/or in pulses. The RF power preferably does not include data. Preferably, the RF power is used to charge at least one battery. The RF power preferably is used to power at least one device.

The present invention pertains to a system for power transmission. The system comprises a receiver 12 including a receiver antenna 22. The system comprises an RF power transmitter including a transmitter antenna, wherein the RF power transmitter transmits RF power in multiple polarizations, and the receiver converts the RF power to current.

The present invention pertains to a controller 36 for controlling power transmission of at least one source and/or at least one antenna 22 to a receiver 12 which converts the power into current. The controller 36 comprises means for issuing instructions to the at least one source and/or the at least one antenna 22. The controller 36 comprises means for storing information concerning the power transmission.

Preferably, the means for issuing instructions is a processor 38. The means for storing information is preferably a memory 40. Preferably, the controller 36 further includes a communication antenna 23 in communication with the processor 38 through which the instructions are sent.

More specifically, in the operation of the invention, in order to supply power to stationary and mobile devices using radio frequency (RF) energy, it is desirable to establish an infrastructure, for example, similar to a cellular telephone network. A network (infrastructure) can take many different forms.

Referring to FIG. 1, a network 10 according to the present invention includes a first node 14 (implemented with transmitter TX1) that provides power to a first area 26. A second node 16 (implemented with transmitter TX2) provides power to a second area 28.

It should be noted that TX1 and TX2 in FIG. 1 contain an RF transmitter and an antenna 22. Subsequent figures may use the same transmitter 20 block or may separate a transmitter 20 and antenna 22, specifically when the transmitter 20 is driving multiple antennas 22. When driving multiple antennas, the transmitter 20 may be referred to as a source or an RF power transmission source and may contain a switch, splitter, or other device for routing power.

The configuration in FIG. 1 allows TX1 to deliver power to a device including a receiver 12 in its coverage area (first area 26) and TX2 to deliver power to a device including a receiver 12 in its coverage area (second area 28). The device to be powered may be the same device moving from the first area 26 to the second area 28, and vice versa. Additionally, more than one device may be powered by the network 10, for example, a device in each coverage area. Also, more than one device may be powered within each coverage area. For example, as shown in FIG. 1, a first device may include a first receiver RX1, a second device may include a second receiver RX2, and a third device may include a third receiver RX 3. Receivers 12, RX1, RX2, etc. include an antenna 22.

A coverage area is defined by a minimum electric and/or magnetic field strength. As an example, the first area 26 may be defined as an area in which the electric field strength generated by TX1 is greater than two volts per meter (2 V/m).

Referring to FIG. 2, the first coverage area 26 and the second coverage area 28 may overlap to provide power to a greater area, which is larger than any single coverage area from a single transmitter 20. In an overlap area, a device receives power from both transmitters. For example, in the position shown, RX 3 receives power from both TX1 and TX2.

Figure 3:
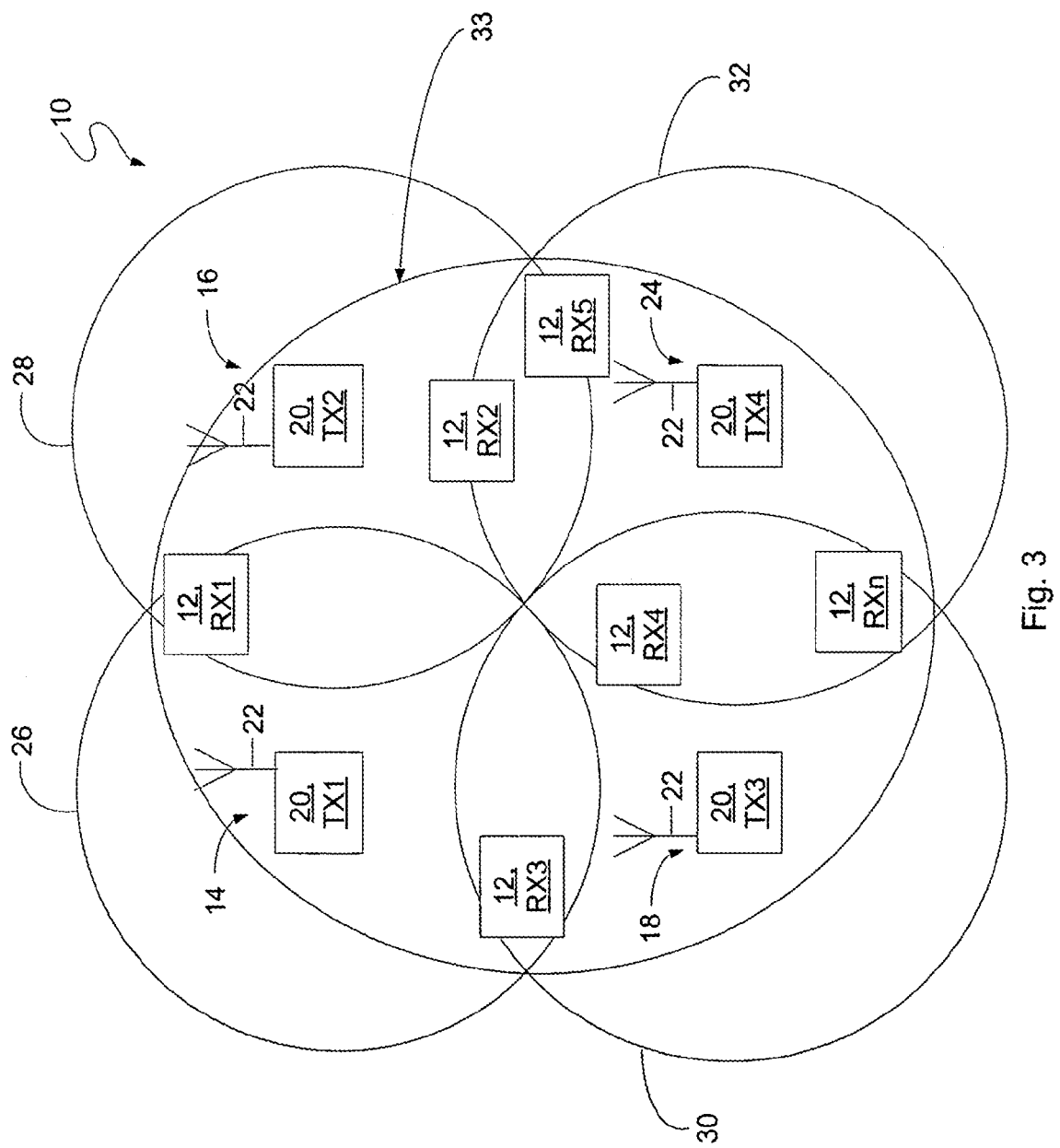
FIG. 3 shows a power network that combines multiple coverage areas to provide a greater coverage area.

Referring to FIG. 3, a first area 26 through a fourth area 32 are arranged such that they overlap each other. This creates a required coverage area 33 that is greater than any individual coverage area (26, 28, 30, and 32). It should be noted that each coverage area may overlap one or more (or no) other coverage areas, depending on the required coverage area 33 for the implementation of the network 10.

In this arrangement, each receiver 12 may be powered by more than one transmitter 20 due to area overlap. Area overlap occurs when two or more transmitters 20 are able to produce a field strength greater than the minimum value used to define the areas at a given point. As an example, a third receiver RX3 will receive power from both TX1 and a third transmitter TX3. The merging of areas can be expanded indefinitely to cover larger required coverage areas 33 and different overall coverage arrangements (i.e., other than a circle).

In a cellular telephone network, area overlap is detrimental to network performance. However, in transmission of RF power, area overlap is not detrimental to the performance of the network 10. Cellular telephone networks have problems with overlap due to data collisions. The lack of data in RF power networks allows area overlap without this problem.

One problem that does arise, though, is phase cancellation. This is caused when two electromagnetic (EM) waves destructively interfere. This interference can cause dead spots. Dead spots are regions where the field strength is below the defined minimum value. Phase cancellation can cause dead spots within a coverage area.

Figure 4:
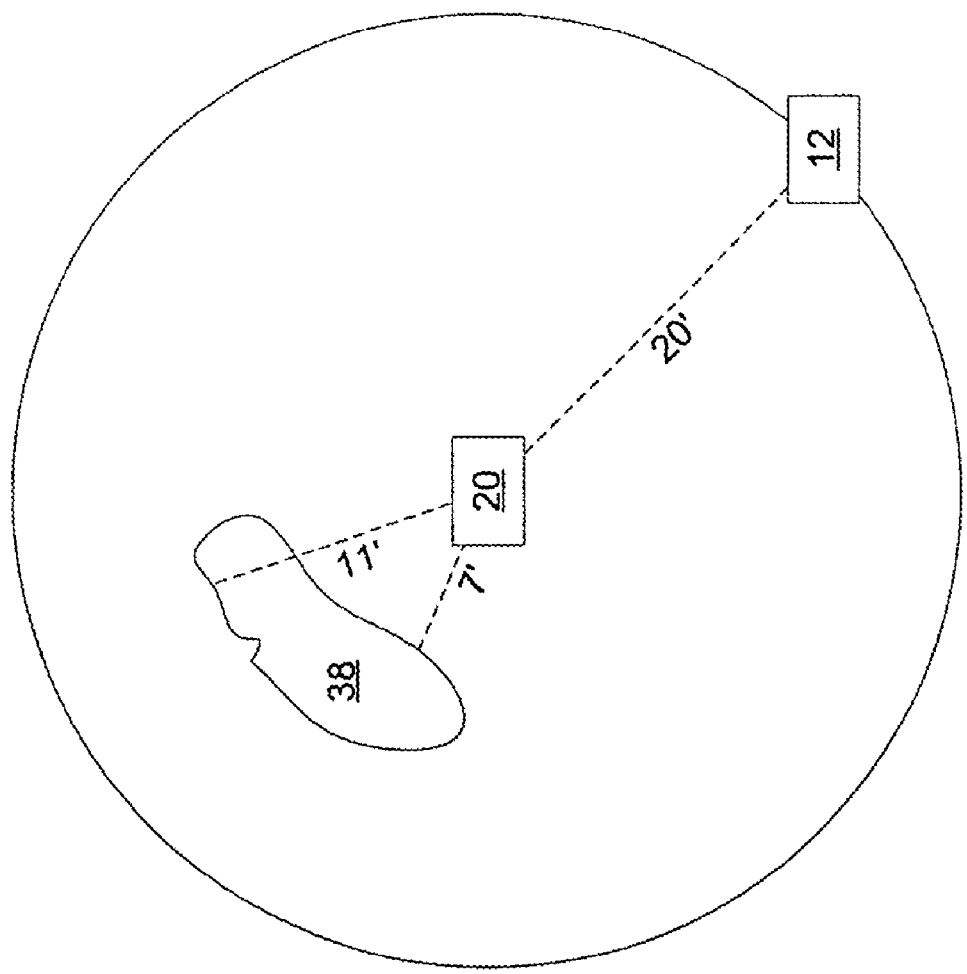
FIG. 4 shows a dead spot within a coverage area.

As an example, referring to FIG. 4, it can be estimated that a transmitter 20 should be able to supply the required field strength to a receiver 12 at 20 feet. If the device containing the receiver 12 is tested at a radius of twenty feet from the transmitter 20, it may be found that the device will work at twenty feet. However, there is a region between seven and eleven feet where the field strength is too low to operate the device. This area is termed a dead spot 38.

There are several ways to combat this issue. One method, which is similar to a simple cellular network, is to have the transmitters 20 of overlapping areas on different frequencies or channels. Another solution is to have the transmitters 20 of overlapping areas on different polarizations, such as horizontal and vertical. Table 1 outlines how the network 10 in FIG. 3 could be implemented to alleviate dead spots.

TABLE 1

Methods to alleviate dead spots for the network in FIG. 3

| Method | TX1 | TX2 | TX3 | TX4 |
|---|---|---|---|---|
| Non-overlapping Frequencies | Frequency 1 | Frequency 2 | Frequency 2 | Frequency 1 |
| Non-overlapping Polarization | Horizontal Polarization | Vertical Polarization | Vertical Polarization | Horizontal Polarization |

Figure 5:
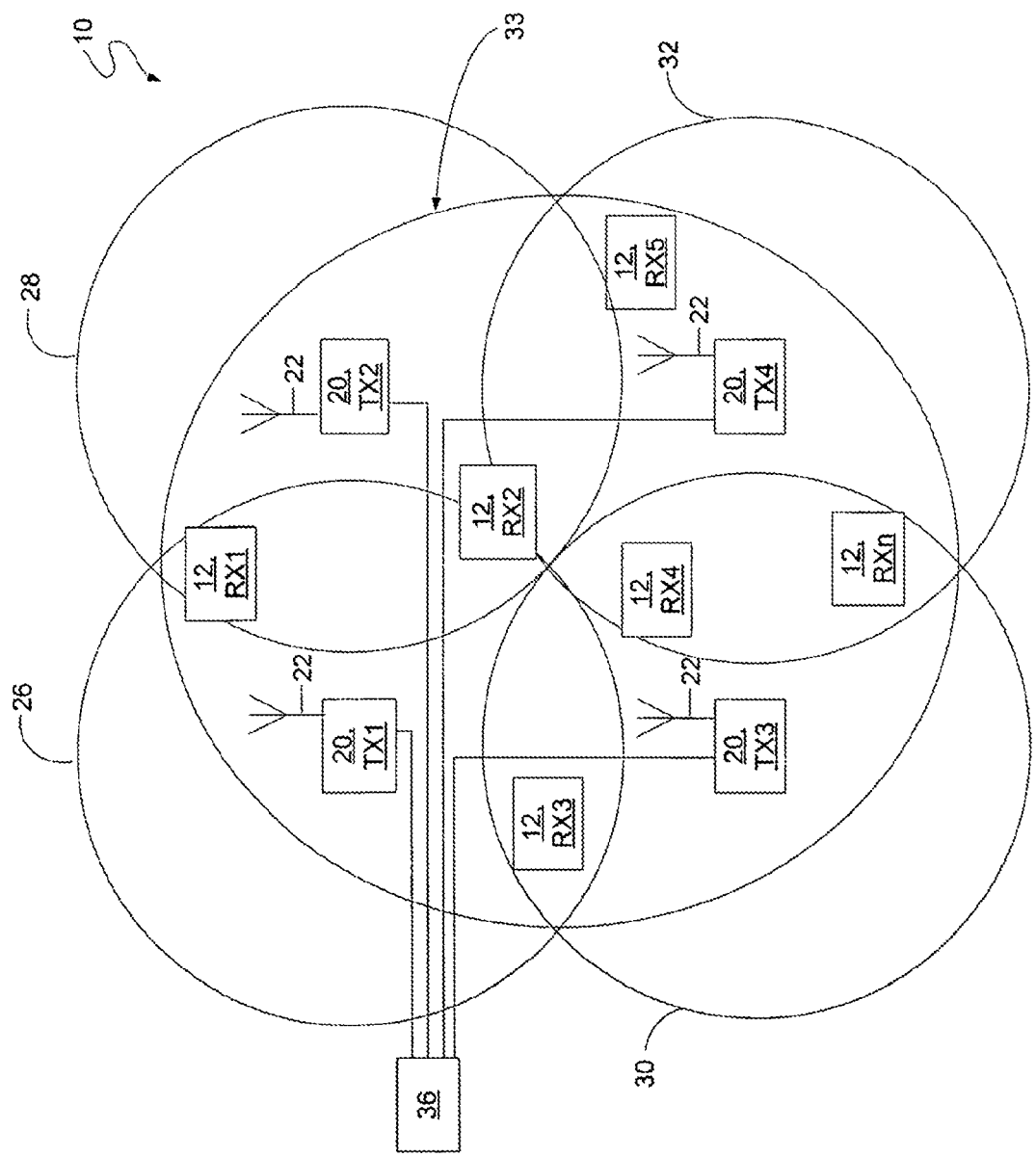
FIG. 5 shows a power network implemented with a controller.

It is also possible to alternate the polarization of an antenna 22 in a given coverage area (26, 28, 30, 32) such that the antenna 22 switches from horizontal to vertical in a repetitive fashion, while not taking the polarization of an overlapping coverage area. In order to accomplish this, a controller 36 may be introduced into the network 10 to oversee operation of the transmitters 20 and/or antennas 22, as shown in FIG. 5.

FIG. 6 shows suitable implementations of the controller 36. One implementation of the controller 36 contains a central processing unit (CPU) or microcontroller unit (MCU) 38 and memory 40. This could be realized by using a microprocessor or simply a standard computer. The output of the controller is in communication with each transmitter 20 and/or antenna 22. Each transmitter 20 and/or antenna 22 contains means for receiving and/or transmitting data and implementing a desired effect.

The communication link from the controller 36 may be implemented with a wired connection or a wireless link When a wireless link is used, the controller 36 contains a transceiver 44 and a communication antenna 23. Each transmitter 20 and/or antenna 22 also contains a transceiver and a communication antenna 23 to receive and transmit data.

Figure 14:
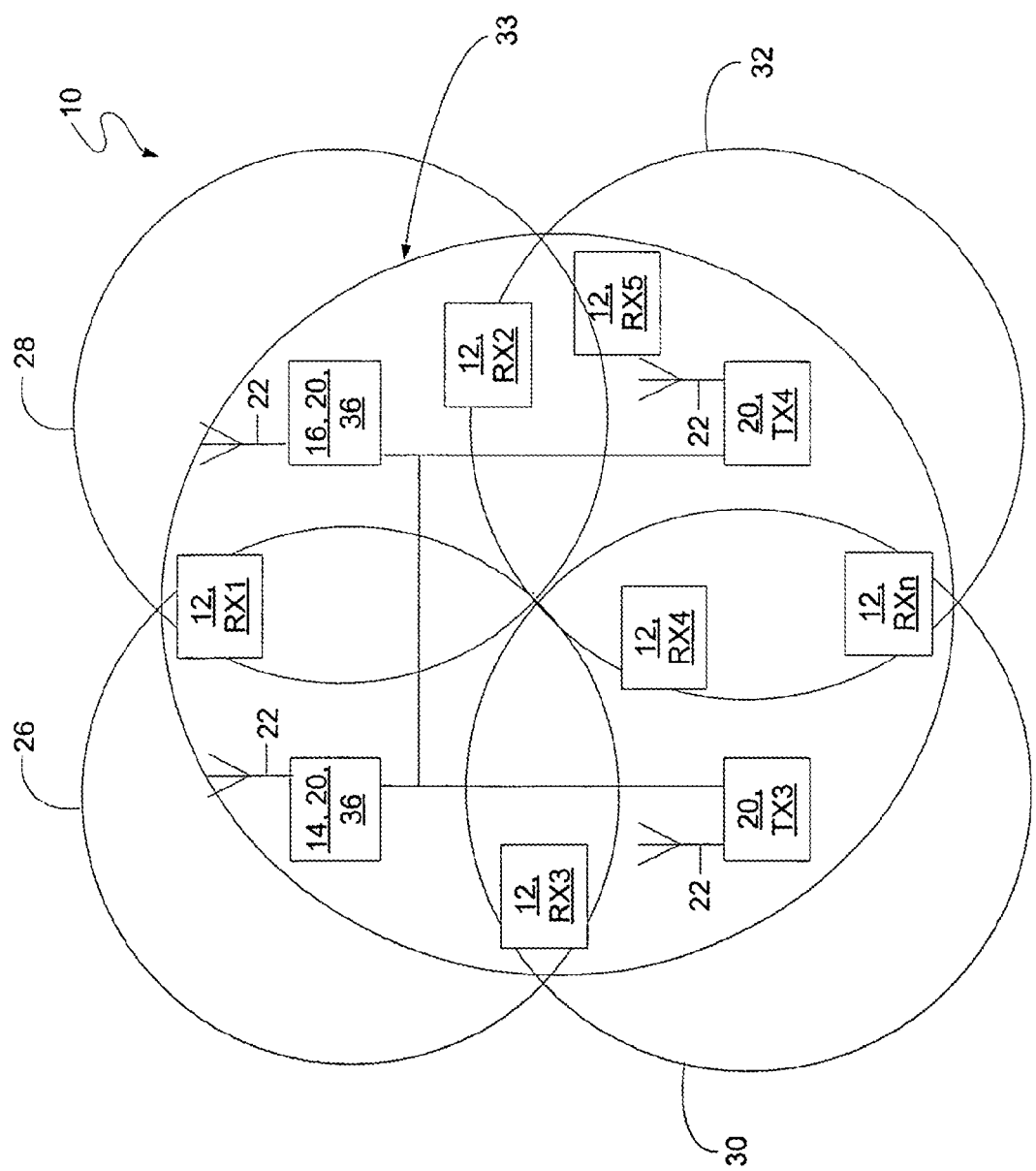
FIG. 14 shows a power network with multiple transmitters having integrated controllers used to create multiple coverage areas.

Referring to FIG. 14, another way to implement the switching methods is to integrate a controller 36 into each transmitter unit or node 14, 16, etc. The controllers 36 may communicate over a wired connection or by using a wireless link. The MCU or CPU of each controller 36 receives and transmits data and implements the desired effect by communicating with the transmitter 20 and/or antenna 22.

The added functionality provided with a controller 36, either stand-alone or integrated into each transmitter unit or node 14, 16, etc., allows for more elaborate methods to eliminate dead spots. By introducing a controller 36, each area has knowledge of the others' operations. For this reason, it is now possible to change the frequencies, polarizations, and/or shapes of the areas. It also becomes possible to turn each transmitter 20 on and off to form a pulsing network 10. The following table summarizes a few of the possible methods for eliminating dead spots using the network in FIGS. 5 and 14.

TABLE 2

Methods to alleviate dead spots for the network in FIGS. 5 and 14

| Method | Time Period | TX1 | TX2 | TX3 | TX4 |
|---|---|---|---|---|---|
| Non-overlapping Frequencies | 1 | Frequency 1 | Frequency 2 | Frequency 2 | Frequency 1 |
| | 2 | Frequency 2 | Frequency 1 | Frequency 1 | Frequency 2 |
| | 3 | Frequency 1 | Frequency 2 | Frequency 2 | Frequency 1 |
| | Etc. | | | | |
| Non-overlapping Polarization | 1 | Horizontal Polarization | Vertical Polarization | Vertical Polarization | Horizontal Polarization |
| | 2 | Vertical Polarization | Horizontal Polarization | Horizontal polarization | Vertical Polarization |
| | 3 | Horizontal Polarization | Vertical Polarization | Vertical Polarization | Horizontal Polarization |
| | Etc. | | | | |
| Pulsing | 1 | ON | OFF | OFF | OFF |
| | 2 | OFF | ON | OFF | OFF |
| | 3 | OFF | OFF | ON | OFF |
| | 4 | OFF | OFF | OFF | ON |
| | 5 | ON | OFF | OFF | OFF |
| | Etc. | | | | |

As an example, the network 10 in FIG. 5 may be used to provide power to parameter sensors at a nuclear power plant to sense intruders. The four transmitters TX1, TX2, TX3, TX4 are arranged to provide coverage over an entire fence line (required coverage area 33). The antennas 22 could be mounted on towers and produce directional or omni-directional patterns. Each overlapping coverage area 26, 28, 30, 32 may be placed on a separate channel The channel frequencies should be spaced far enough apart to avoid interference, although it may be beneficial to keep the channels close enough such that the same antenna 22 design could be used with each transmitter 20.

Figure 7:
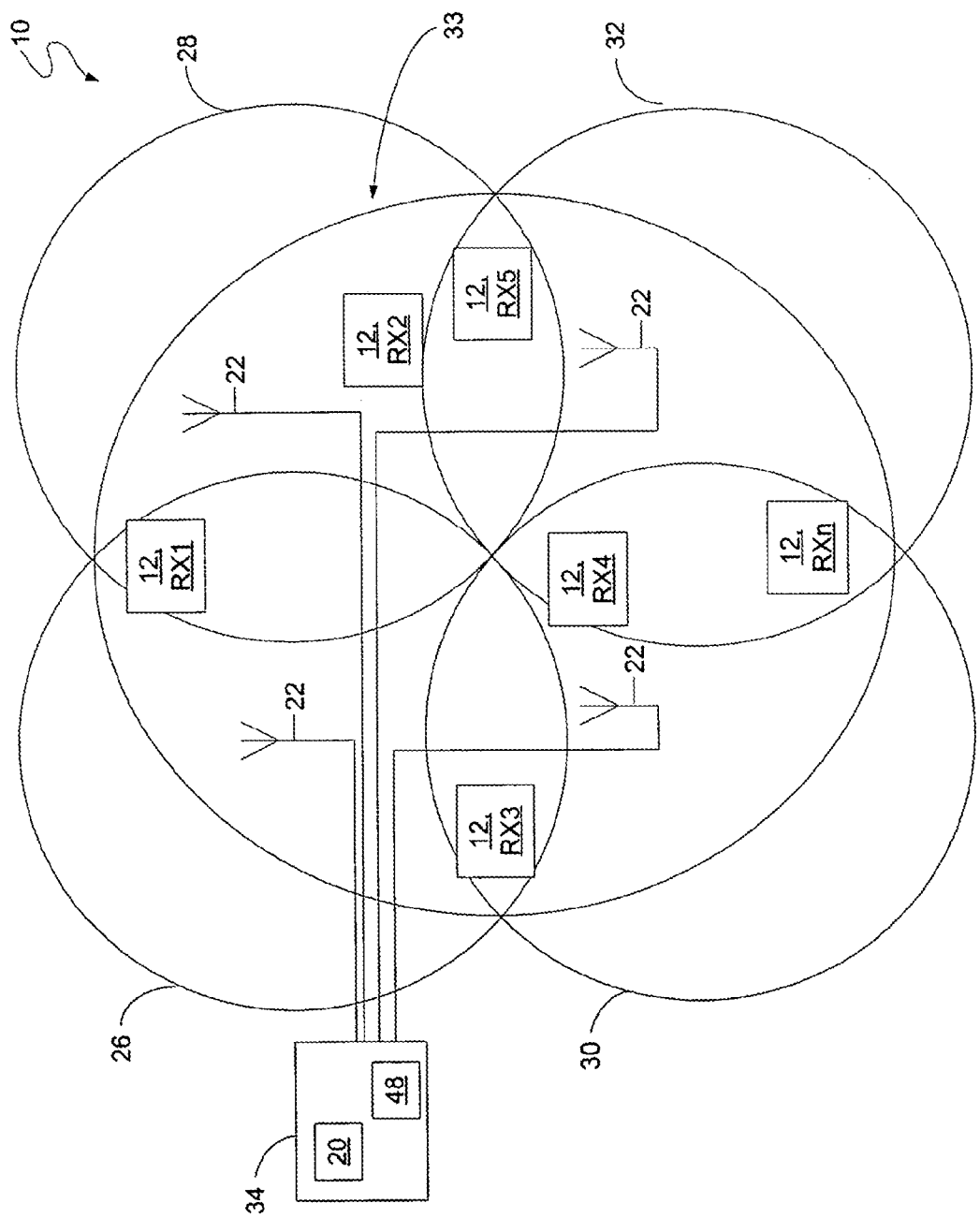
FIG. 7 shows a power network with a source with multiple antennas used to create multiple coverage areas.
Figure 15:
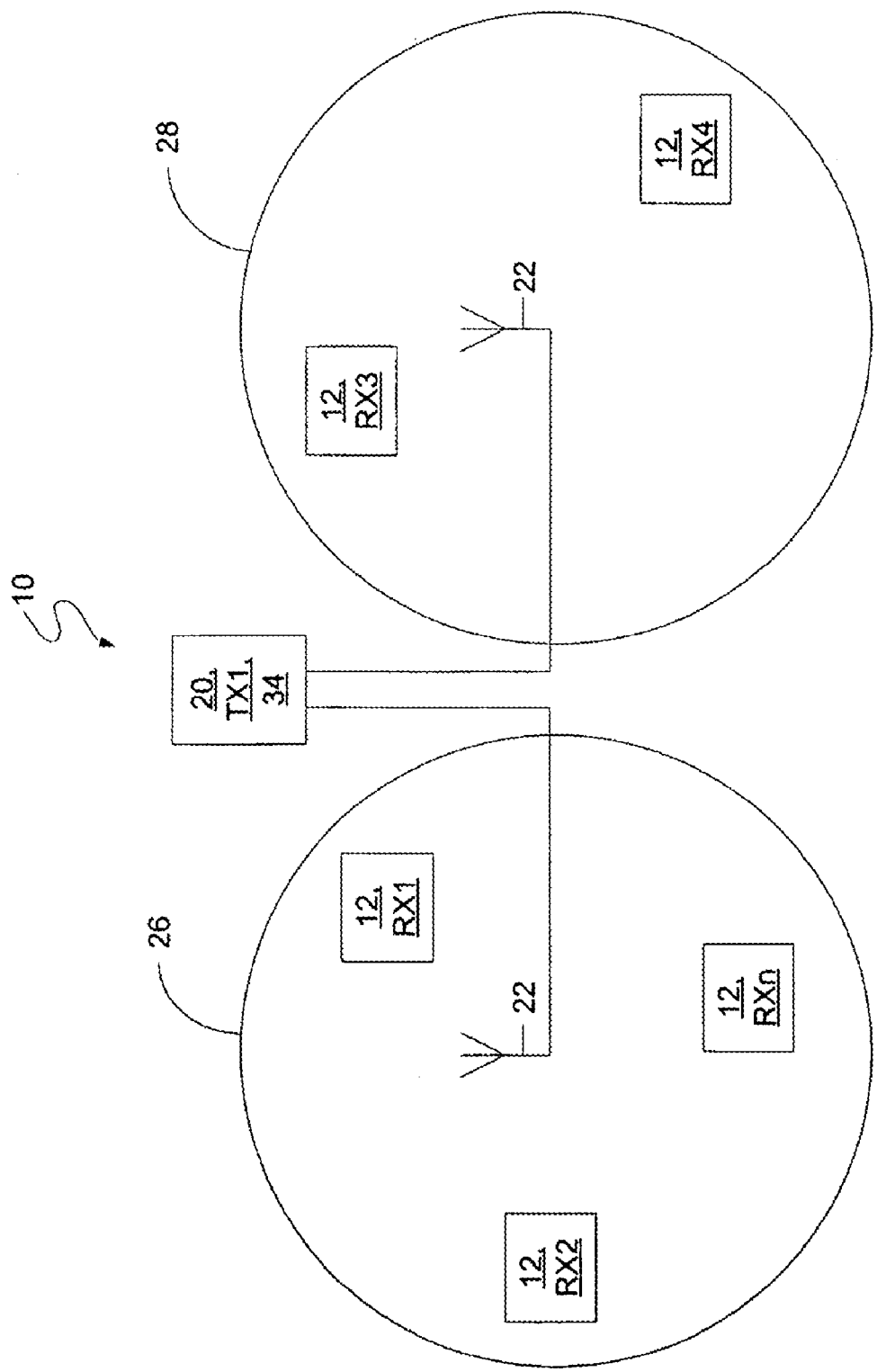
FIG. 15 shows a power network with a single transmitter with multiple antennas used to create multiple coverage areas.
Figure 16:
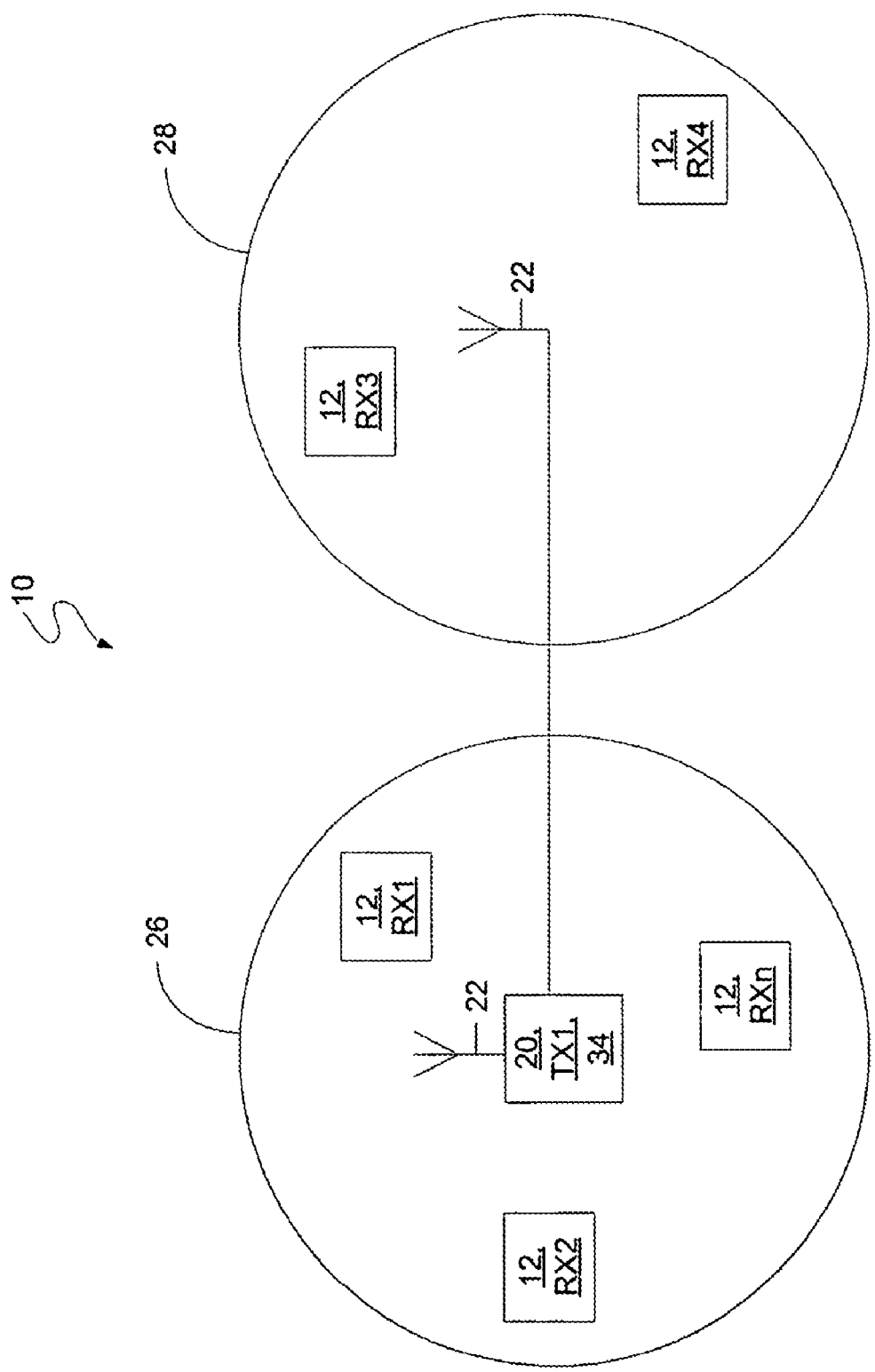
FIG. 16 shows a power network with a single transmitter with multiple antennas used to create multiple coverage areas.

Another embodiment of the present invention is shown in FIG. 15. In the network 10, a single transmitter 20 feeds multiple antennas 22. Coverage areas 26 and 28 may be non-overlapping, as shown, or may overlap. As illustrated in FIG. 16, the transmitter may be included in a coverage area 26. The network 10 may be expanded to include additional coverage areas 30 and 32 as shown in FIG. 7.

The distribution of power to the antennas 22 can be accomplished in numerous ways. One way includes a parallel feed system as shown in FIG. 7. The parallel feed system is implemented by integrating a device for routing power 48 (such as a power splitter, switch) into the transmitter 20. Each of the outputs from the power splitter is connected to an antenna 22 with an associated coverage area 26, 28, 30, 32.

The network 10 would suffer from phase cancellation, which in turn causes dead spots. One way to alleviate this issue is to use a method similar to the one set forth in U.S. Provisional Patent Application Ser. No. 60/656,165, incorporated by reference herein. The application describes pulsing the transmitter 20 to help increase the efficiency of the receiver 12. This pulsing method can also be used with a network 10 to help eliminate dead spots.

Figure 8:
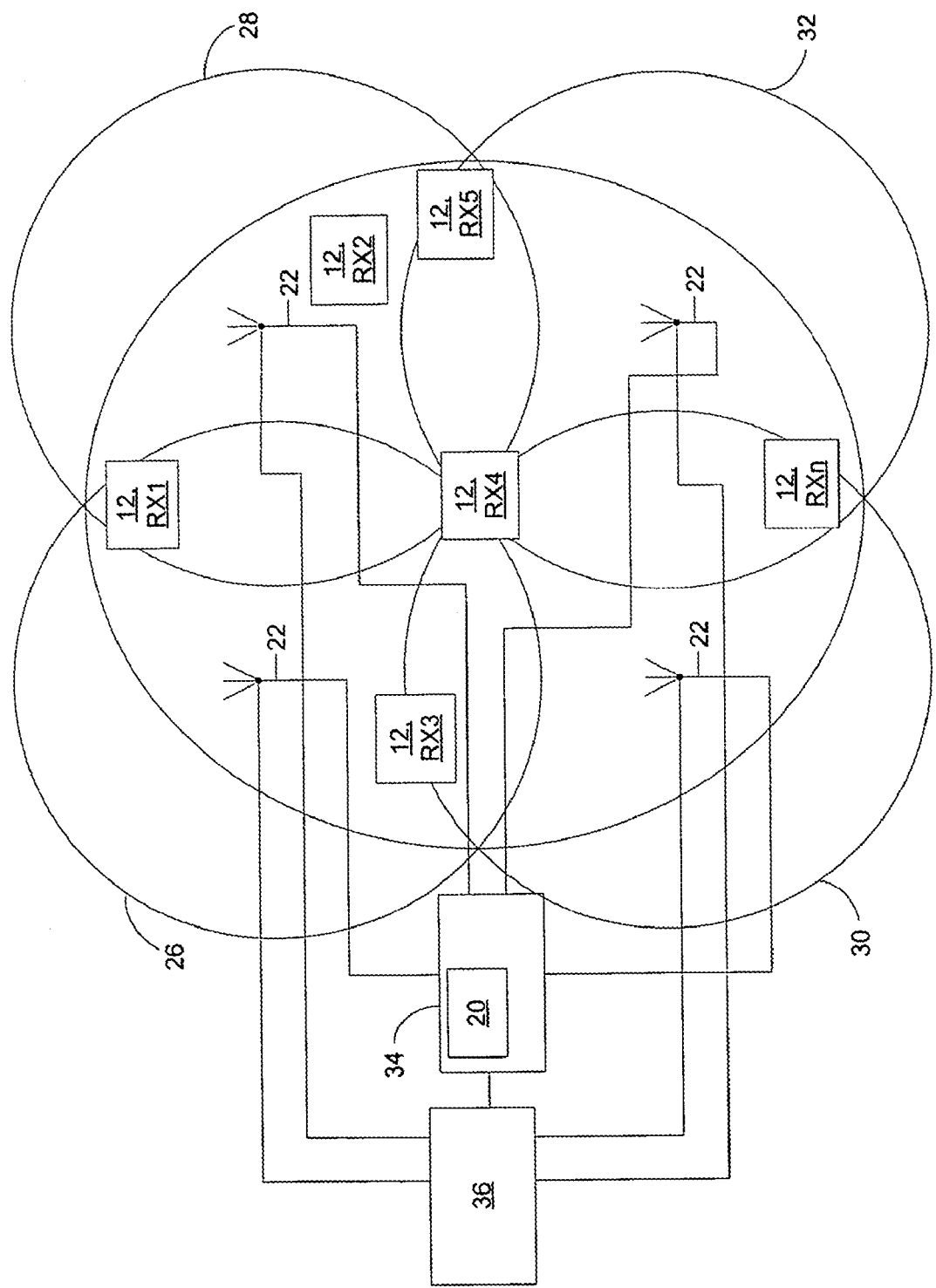
FIG. 8 shows a power network with a controller and a source with multiple antennas used to create multiple coverage areas.

An example of a pulsing network 10 with a single transmitter 20 is shown in FIG. 8. A controller 36 controls the output of a transmitter 20 to pulse each antenna 22 either sequentially to insure that only one antenna 22 is active at a given time or in a pattern that will not activate antennas 22 of overlapping coverage areas at the same time, but may activate antennas 22 of non-overlapping coverage areas at the same time. Because only one antenna 22 in a given area is active at a given time, no phase cancellation occurs due to area overlap.

There is still phase cancellation caused by reflections from objects within the coverage area. However, this method minimizes the effect of phase cancellation caused by reflects because the field is constantly changing its incident angle on a receiver 12. As an example, in FIG. 8, RX4 will receive a field from the upper left when coverage area 26 is active, from the upper right when coverage area 28 is active, from the lower left when coverage area 30 is active, and from the lower right when coverage area 32 is active. Consequently, if RX4 is in a dead spot of coverage area 30 due to reflections, it will most likely not be in a dead spot of coverage area 32. This means the receiver 12 will capture power from the system in this location.

Another issue that is alleviated by this system is shadowing caused by multiple receivers 12. Shadowing occurs when a receiver 12 is located behind another receiver 12 with respect to an active transmitter 20 or antenna 22. The receiver 12 closest to the transmitter 20 or antenna 22 will capture most of the power available at that angle with respect to the transmitter 20 or antenna 22. This means the receiver 12 in the back will receive little or no power.

An example of this can be seen in FIG. 8. When coverage area 28 is active, RX2 will cast a shadow on RX5, and RX5 will receive little or no power. The use of a network 10 using pulsing eliminates this problem. RX5 will receive little or no power from the antenna 22 in coverage area 28, but when coverage area 32 becomes active, RX5 will receive power.

It should be noted that the controller 36 in FIG. 8 could be used to change the frequency, polarization, or radiation pattern of the antennas 22. Also, if found advantageous, the controller 36 could be integrated into the transmitter 20. The controller 36 may be in communication with both the transmitter 20 and/or the antennas 22.

Figure 9:
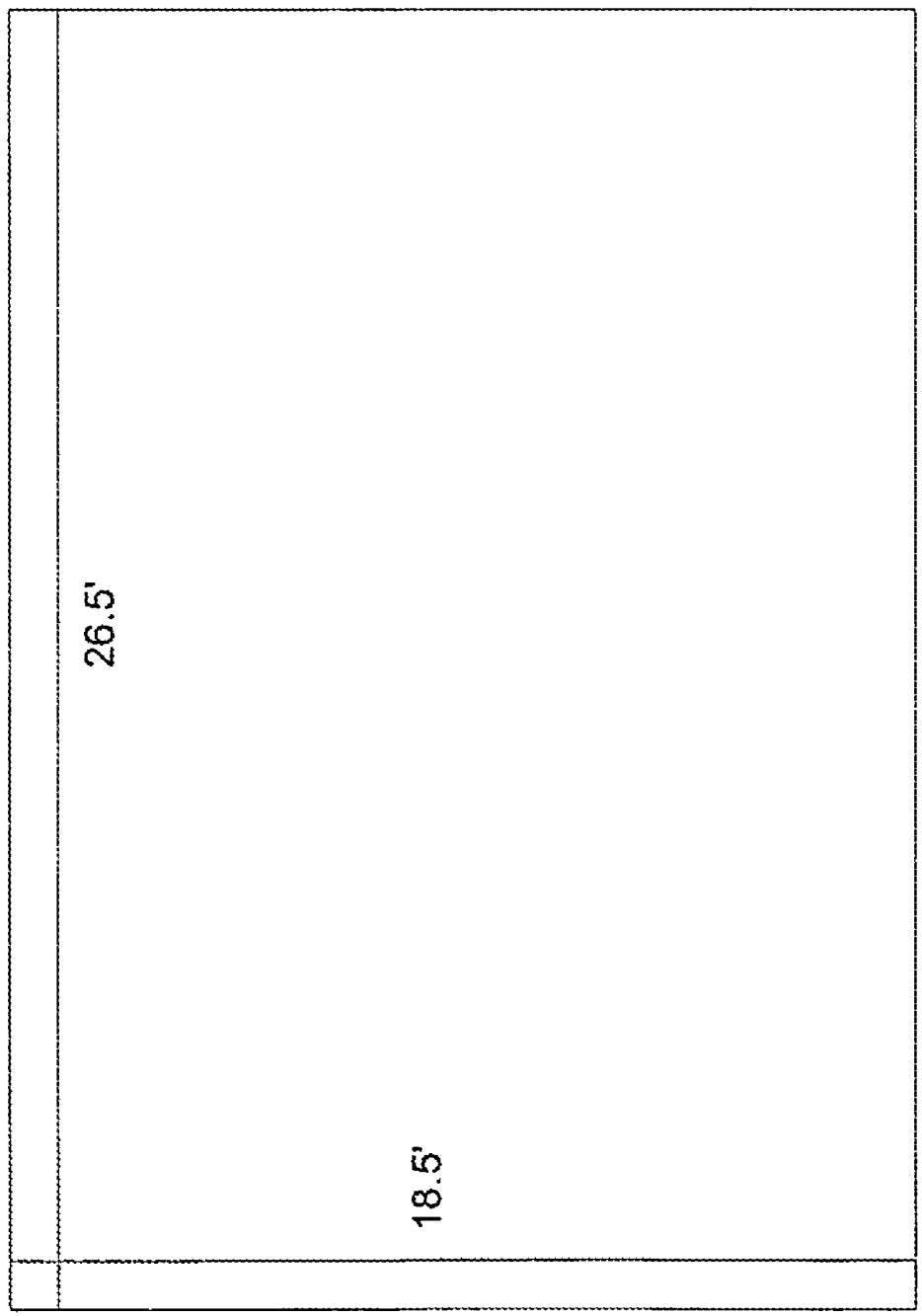
FIG. 9 shows a room for implementing a power network.

A test network 10 similar to the network 10 shown in FIG. 8 was constructed for an RF power network. The coverage area was defined as a 26.5 foot by 18.5 foot room 42, as illustrated in FIG. 9.

Figure 10:
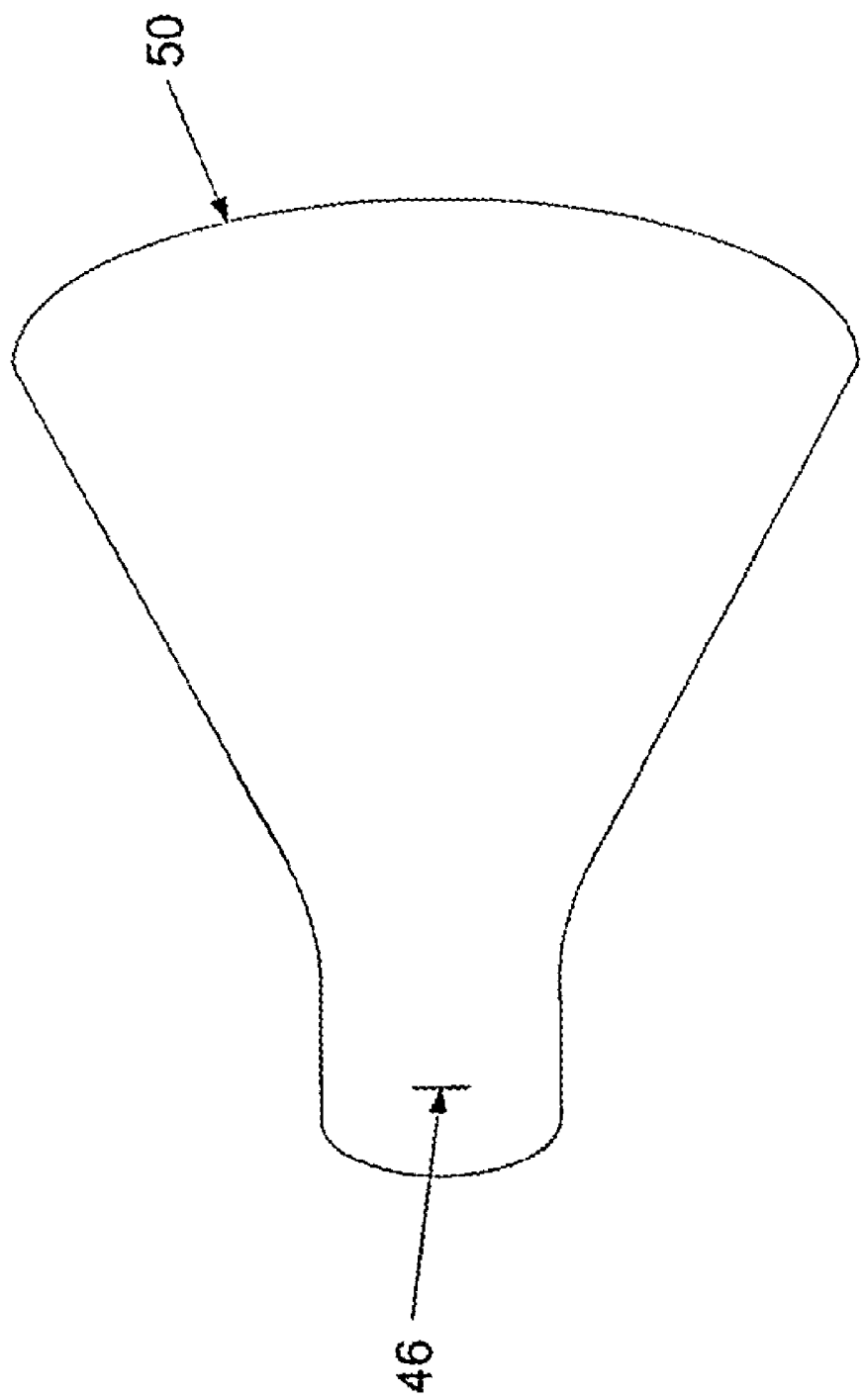
FIG. 10 shows a patch antenna coverage area for the room shown in FIG. 9.

Various antennas for the test network 10 were evaluated to determine individual coverage areas. In the implemented test network 10, a patch antenna 46 was used. FIG. 10 shows a coverage area 50 for a patch antenna 46. Larger coverage areas 50 can be obtained by increasing the transmitter's 20 power level. With an increase in power, the coverage area 50 will keep its general shape, but the dimensions will increase.

Figure 11:
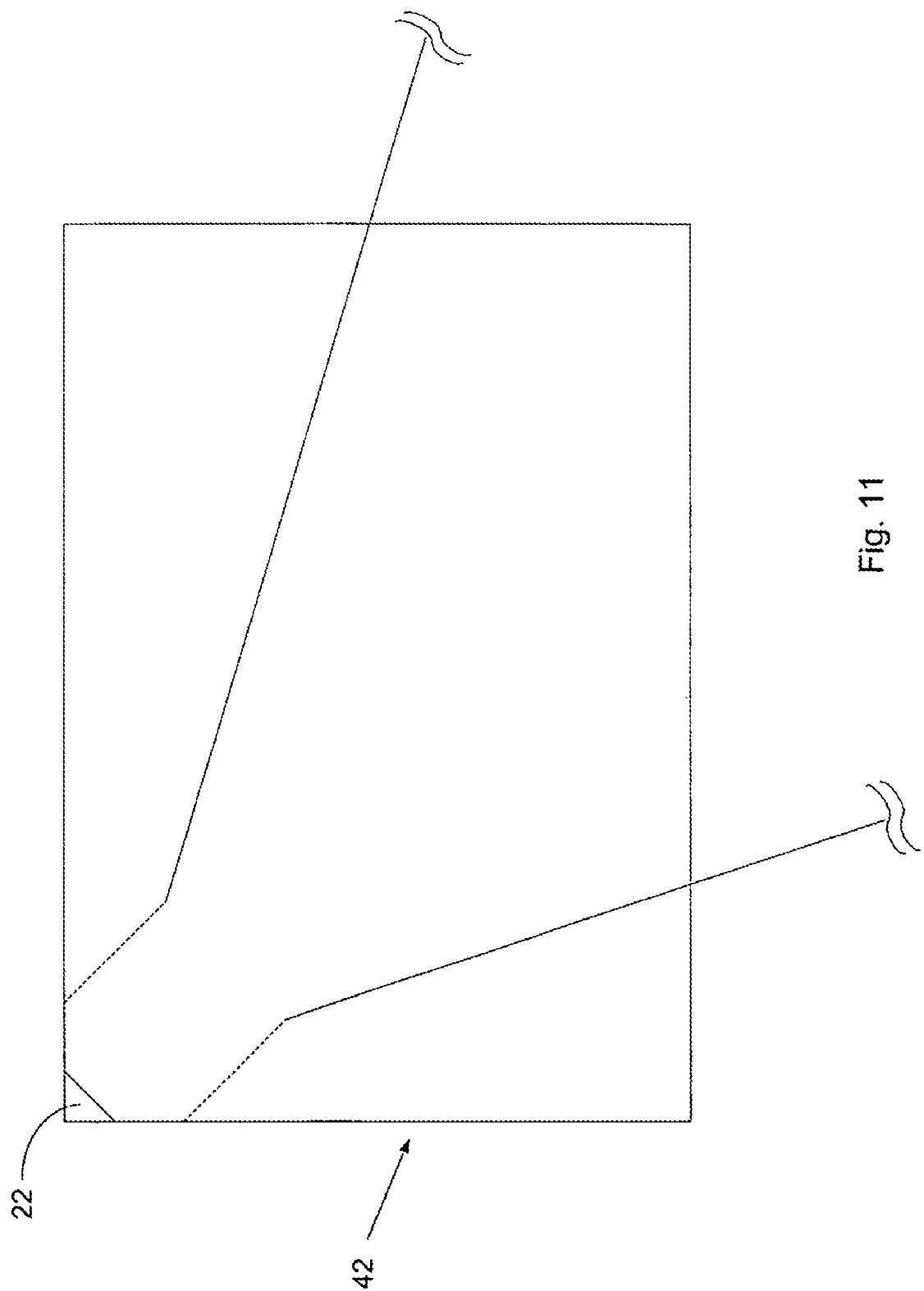
FIG. 11 shows coverage of the room shown in FIG. 9 with a single patch antenna in one of the corners.

FIG. 11 shows the coverage provided by a single patch antenna 46 in one of the corners. As can be seen in FIG. 11, only partial coverage is obtained.

To provide better coverage, the test network 10 included a patch antenna 46 in each corner to provide coverage over almost the entire room 42. The four patch antennas 46 were the same.

Figure 12:
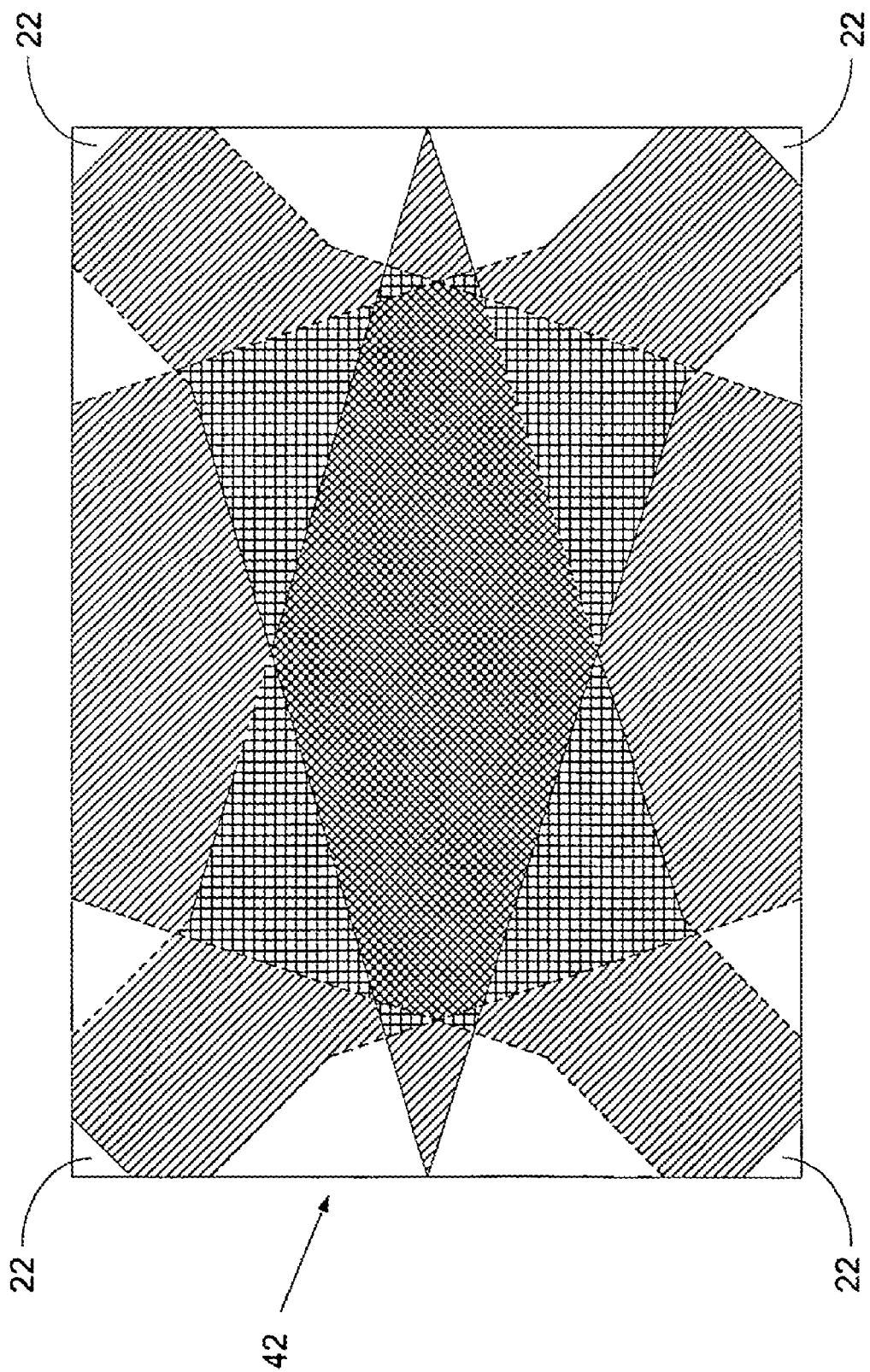
FIG. 12 shows a power network within the room shown in FIG. 9.

FIG. 12 shows the coverage achieved by the test network 10 including a patch antenna 46 in each corner. Nearly full coverage was achieved. The diamond hatched section is where all four coverage areas overlap. The checkered hatched sections are where three coverage areas overlap, while the diagonal hatched sections are where two areas overlap. The white areas are where only one coverage area is present.

The test network 10 was implemented with a single transmitter 20, as shown in FIG. 8. The transmitter 20 received its power from a room/building AC main, but could also be run by other power means (source), such as a battery pack.

The transmitter 20 had an integrated single-pole four-throw switch. The operation of the transmitter 20 was monitored by a controller 36, which was implemented with a microcontroller. Each output of the switch was connected to an individual antenna 46 using coaxial cable. The controller 36 was used to sequentially switch the transmitter's 20 outputs through the four perimeter antennas 46 to produce a pulsing waveform from each antenna 46. The implementation showed a decrease in shadowing effects and almost no dead spots due to the reasons previously described.

Figure 13:
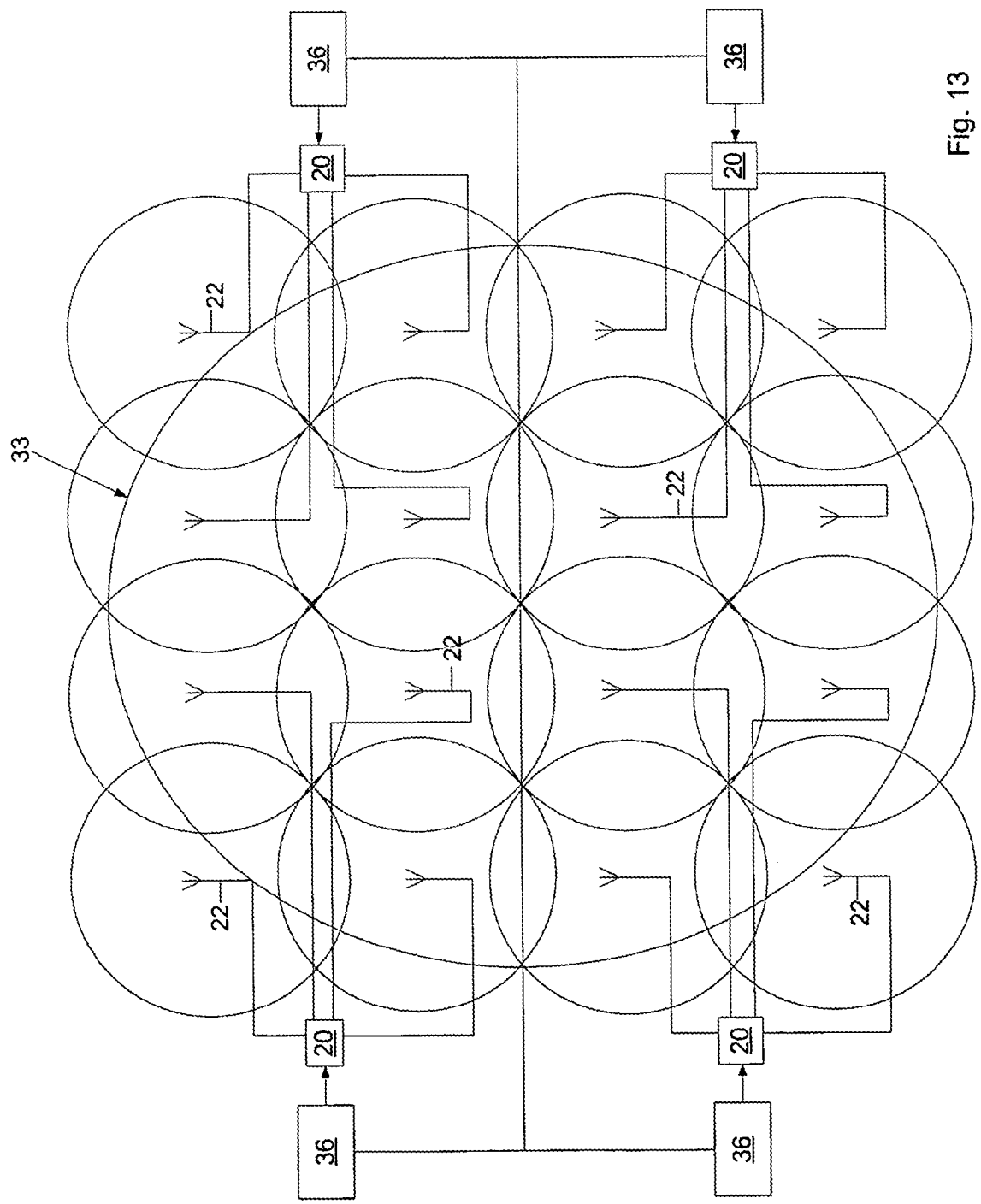
FIG. 13 shows a power network with multiple transmitters, multiple controllers, and multiple antennas used to create multiple coverage areas.

When larger coverage areas are required, the networks 10 previously described may be expanded to include more antennas 22, or the networks 10 shown in FIGS. 7 and/or 8 could be repeated. FIG. 13 illustrates a repetition of the network 10 shown in FIG. 8. The frequency, polarization, and pulsing solutions previously described could be applied to this network using controllers 36 to alleviate the interference. As an example, if a pulsing method is employed, the networks 10 can be designed so that no overlapping areas are energized at the same time.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A system, comprising:
   a controller;
   a first node remote from the controller, the first node configured to transmit power wirelessly to a receiver that converts the power transmitted wirelessly from the first node into a current, the first node defining a first coverage area when wirelessly transmitting power, the first node configured to receive a first instruction effecting an operation of the first node from the controller; and
   a second node remote from the controller, the second node configured to transmit power wirelessly to a receiver that converts the power transmitted wirelessly from the second node into a current, the second node defining a second coverage area when wirelessly transmitting power, the second node configured to receive a second instruction effecting an operation of the second node from the controller.

2. The system of claim 1, wherein the controller is configured to alternate the operation of the first node and the second node to produce a pulsing network when the second coverage area overlaps at least a portion of the first coverage area, the first node enabled to wirelessly transmit power when the second node is disabled to wirelessly transmit power, the first node disabled to wirelessly transmit power when the second node is enabled to wirelessly transmit power.

3. The system of claim 1, further comprising:
   a third node configured to transmit power wirelessly to a receiver that converts the power transmitted wirelessly from the third node into a current, the third node defining a third coverage area when wirelessly transmitting power,
   the controller being configured to sequentially enable the operation of the first node, the second node and the third node to produce a pulsing network.

4. The system of claim 1, further comprising:
   a third node configured to transmit power wirelessly to a receiver that converts the power transmitted wirelessly from the third node into a current, the third node defining a third coverage area when wirelessly transmitting power,
   the controller being configured to alternate the operation of the first node, the second node and the third node to produce a pulsing network when the third coverage area overlaps at least a portion of the first coverage area and not the second coverage area, the first node being enabled to wirelessly transmit power when the second node is disabled to wirelessly transmit power and the third node is disabled to wirelessly transmit power, the second node being enabled to wirelessly transmit power when the first node is disabled to wirelessly transmit power and the third node is enabled to wirelessly transmit power, the third node being enabled to wirelessly transmit power when the first node is disabled to wirelessly transmit power and the second node is enabled to wirelessly transmit power.

5. The system of claim 1, wherein the first node includes an antenna configured to transmit the power based on the first instruction, the second node includes an antenna configured to transmit the power based on the second instruction, the controller configured to alternate operation of the antenna of the first node and the antenna of the second node when the first coverage area overlaps at least a portion of the second coverage area.

6. The system of claim 1, wherein the first node includes an antenna configured to transmit the power based on the first instruction, the antenna of the first node having a horizontal polarization during a first time period and a vertical polarization during a second time period,
   the second node includes an antenna configured to transmit the power based on the second instruction, the antenna of the second node having a vertical polarization during the first time period and a horizontal polarization during the second time period.

7. The system of claim 1, wherein the first node is configured to wirelessly transmit power at a first frequency during a first time period and a second frequency during a second time period based on the first instruction, the second node is configured to wirelessly transmit power at the first frequency during the second time period and the second frequency during the first time period based on the second instruction, the first coverage area overlapping at least a portion of the second coverage area during the first time period and the second time period.

8. The system of claim 1, wherein the controller includes a communication antenna, the controller being configured to wirelessly transmit the first instruction to the first node via the communication antenna.

9. The system of claim 1, wherein the second instruction is based on the first instruction.

10. The system of claim 1, wherein the first node is enabled to wirelessly transmit power when the second node is enabled to wirelessly transmit power.

11. An apparatus, comprising:
a transmitter having a first antenna and a second antenna, the first antenna of the transmitter configured to transmit power wirelessly to a receiver that converts the power transmitted wirelessly from the first antenna into a current, the first antenna defining a first coverage area when wirelessly transmitting power, the second antenna of the transmitter configured to transmit power wirelessly to a receiver that converts the power transmitted wirelessly from the second antenna into a current, the second antenna defining a second coverage area that overlaps at least a portion of the first coverage area when wirelessly transmitting power, the transmitter configured to alternate operation of the first antenna and the second antenna, the transmitter configured to wirelessly receive instructions from a controller separate from the transmitter, the transmitter configured to control operation of the first antenna and the second antenna based on the instructions from the controller.

12. The apparatus of claim 11, wherein the transmitter is configured to repeatedly switch the first antenna between a horizontal polarization and a vertical polarization and to repeatedly switch the second antenna between a horizontal polarization and a vertical polarization, the polarization of the first antenna being different than the polarization of the second antenna at any given time.

13. The apparatus of claim 11, wherein the transmitter is configured to repeatedly switch between enabling and disabling transmission at the first antenna based on the operation of the second antenna.

14. The apparatus of claim 11, wherein the transmitter is a first transmitter, the first transmitter includes a processor configured to control operation of the first antenna and the second antenna based on data received from a second transmitter.

15. The apparatus of claim 11, wherein the transmitter is located outside of at least one of the first coverage area or the second coverage area.

16. The apparatus of claim 11, wherein the transmitter is connected to at least one of the first antenna or the second antenna via a cable.

17. The apparatus of claim 11, wherein the transmitter includes at least one of a power splitter or a switch, configured to alternately route power to the first antenna and the second antenna.

18. The apparatus of claim 11, wherein the transmitter includes a third antenna configured to transmit power wirelessly to a receiver that converts the power transmitted wirelessly from the third antenna into a current, the third antenna defining a third coverage area that overlaps at least a portion of the first coverage area and not the second coverage area when wirelessly transmitting power, the transmitter configured to sequentially enable the operation of the first antenna, the second antenna and the third antenna to produce a pulsing network.

* * * * *